United States Patent [19]

Yie

[11] Patent Number: 5,297,777
[45] Date of Patent: Mar. 29, 1994

[54] INSTANT ON-OFF VALVE FOR HIGH-PRESSURE FLUIDS

[75] Inventor: Gene G. Yie, Auburn, Wash.

[73] Assignee: Jetec Company, Auburn, Wash.

[21] Appl. No.: 22,123

[22] Filed: Feb. 25, 1993

Related U.S. Application Data

[63] Continuation-in-part of Ser. No. 871,895, Apr. 21, 1992, Pat. No. 5,241,986, and Ser. No. 891,568, May 29, 1992, abandoned, which is a continuation-in-part of Ser. No. 701,534, May 16, 1991, Pat. No. 5,117,872, said Ser. No. 871,895, is a continuation-in-part of Ser. No. 794,581, Nov. 19, 1991, Pat. No. 5,186,393, which is a continuation-in-part of Ser. No. 630,560, Dec. 20, 1990, Pat. No. 5,092,362.

[51] Int. Cl.$^5$ .......................... F16K 39/02; F16K 1/12
[52] U.S. Cl. ..................... 251/214; 251/282; 251/324; 277/59; 277/64; 277/112
[58] Field of Search ............... 251/214, 282, 322, 324; 277/59, 64, 110, 112, 182

[56] References Cited

U.S. PATENT DOCUMENTS

| | | | |
|---|---|---|---|
| 492,100 | 2/1893 | Ord | 251/28 |
| 1,861,916 | 6/1932 | Hennebohle | 251/322 X |
| 2,055,576 | 9/1936 | Hollerith | 251/44 X |
| 2,219,290 | 10/1940 | Bijur | 137/543.23 |
| 2,485,504 | 10/1949 | Morgan | 251/324 |
| 2,822,817 | 2/1958 | Benzel | 137/543.23 X |
| 2,892,644 | 6/1959 | Collins | 251/324 X |
| 2,992,817 | 7/1961 | Templeton | 251/324 X |
| 3,199,540 | 8/1965 | Forster | 251/324 X |
| 3,211,164 | 10/1965 | Bender et al. | 251/324 X |
| 3,234,959 | 2/1966 | Feinberg | 137/543.23 X |
| 3,260,499 | 7/1966 | Roemer | 251/214 |
| 3,394,890 | 7/1968 | Heinrich et al. | 239/526 |
| 3,439,705 | 4/1969 | Simko | 137/543.23 |
| 3,469,853 | 9/1969 | Gullick | 277/112 |
| 3,537,653 | 11/1970 | Jones | 239/533.15 |
| 3,561,680 | 2/1971 | Ott | 239/411 |
| 3,565,100 | 2/1971 | Pfleger | 137/543.23 |
| 3,672,575 | 6/1972 | Hinrichs | 239/445 |
| 3,709,507 | 1/1973 | Underwood | 251/324 X |
| 3,765,607 | 10/1973 | Pacht | 239/124 |
| 3,788,347 | 1/1974 | Guth | 137/355.17 |
| 3,802,628 | 4/1974 | Goss et al. | 239/302 |
| 3,885,739 | 5/1975 | Tuttle | 239/124 |
| 3,943,969 | 3/1976 | Rubin et al. | 137/543.23 X |
| 3,986,523 | 10/1976 | Pacht | 137/882 |
| 4,005,733 | 2/1977 | Riddel | 137/625.4 |
| 4,009,860 | 3/1977 | Lingnau | 251/44 |
| 4,024,884 | 5/1977 | Prescott et al. | 251/44 X |
| 4,095,774 | 6/1978 | Garnett et al. | 251/44 X |
| 4,162,763 | 7/1979 | Higgins | 239/583 |
| 4,176,680 | 12/1979 | DeLaunay | 137/538 X |
| 4,216,907 | 8/1980 | Fuller | 239/127 |
| 4,313,570 | 2/1982 | Olsen | 239/583 |
| 4,349,154 | 9/1982 | Pacht | 239/124 |
| 4,371,001 | 2/1983 | Olsen | 137/512.3 |
| 4,406,383 | 9/1983 | Duncan | 251/44 X |
| 4,412,792 | 11/1983 | LaBorde et al. | 137/512.3 X |
| 4,640,305 | 2/1987 | Johnson | 251/214 X |
| 4,640,309 | 2/1987 | Hoffman et al. | 137/596.18 |
| 4,665,944 | 5/1987 | Wallace et al. | 239/124 X |
| 4,699,351 | 10/1987 | Wells | 251/44 X |
| 4,716,924 | 1/1988 | Pacht | 137/543.23 X |
| 4,784,330 | 11/1988 | Hammelmann | 239/526 |
| 4,862,911 | 9/1989 | Yie | 137/512 X |
| 4,953,589 | 9/1990 | Nakamura | |
| 5,103,866 | 4/1992 | Foster | 137/596.15 |

OTHER PUBLICATIONS

One page advertisement from Hydro Manufacturing & Sales, P.O. Box 308, Missouri City, Texas 77459.
Applicant's three sketches describing hand-operated waterjet lance sold by Applicant on Jul. 7, 1989.

*Primary Examiner*—John Rivell
*Attorney, Agent, or Firm*—Speckman, Pauley & Fejer

[57] ABSTRACT

A flow control valve for instant on-off operations with gases or liquids at relatively high pressures, such as pressures between 10,000 psi and 100,000 psi. The valve includes a valve body having two or more valve cavities in communication with each other and defined by two end seal assemblies and one or more valve port seal assemblies. An elongated, round, sliding valve stem is centrally located through the seal assemblies. End plugs are used to support the end seal assemblies. The valve stem has fluid passages which are preferably machined at a mid-section of the valve stem. The valve stem is slid parallel to its longitudinal axis to allow or prevent communication between the valve cavities by way of the fluid passage of the valve stem. Two opposite ends of the valve stem are either not exposed to the working fluid or are exposed to different pressures of the working fluid. With both opposite ends of the valve stem not being exposed to the working fluid, fluid-induced forces of relatively high magnitude are not exerted on the valve stem.

21 Claims, 8 Drawing Sheets

INSTANT ON-OFF VALVE FOR HIGH-PRESSURE FLUIDS

CROSS REFERENCE TO RELATED APPLICATIONS

This application is a continuation-in-part of the following patent applications: co-pending Ser. No. 07/871,895, filed Apr. 21, 1992, now U.S. Pat. No. 5,241,986, which is a continuation-in-part of Ser. No. 07/794,581, filed Nov. 19, 1991, now U.S. Pat. No. 5,186,393, which is a continuation-in-part of Ser. No. 07/630,560, filed Dec. 20, 1990, now U.S. Pat. No. 5,092,362; and co-pending Ser. No. 07/891,568, filed May 29, 1992, now abandoned which is a continuation-in-part of Ser. No. 07/701,534, filed May 16, 1991, now U.S. Pat. No. 5,117,872.

BACKGROUND OF THE INVENTION

1. Field of the Invention

This invention relates to an instant on-off valve having few valve components, and particularly relatively few moving valve components, which is capable of handling fluids, even slurry type fluids, at extremely high operating pressures.

2. Description of Prior Art

By examining the teachings of certain prior references, the advantages of this invention will become more apparent. U.S. Pat. No. 3,672,575 teaches a hand-operated dump valve in which high-pressure fluid is quickly dumped as result of a hand-operated lever action, in order to reduce an intense, high-pressure waterjet. A fluid outlet is opened or closed with a conically-shaped cylindrical poppet, which is referred to as a floating valve. The sliding action of the poppet is governed by a sliding valve pin which is engaged with a hand-actuated lever operated by a handle. Pulling the lever against the handle initiates a chain of actions, resulting in a valve pin being pushed against the valve poppet to close the outlet port and thus allow fluid pressure to build within a valve cavity to a pressure sufficient to form a suitable waterjet through a discharge nozzle. To maintain the relatively high pressure within the valve, the dump port must be closed by hand forces during operation of the valve. Such requirement has proven quite difficult to accomplish in practice, since leakage around the conical valve seat invariably occurs, which can drastically increase the hand force required to keep the dump port closed. Furthermore, seals cannot be easily positioned around the dump port because of a fluid wash-out problem and because of the delicate force balances required for the valve closure.

U.S. Pat. No. 3,765,607 teaches a high pressure fluid system and a nozzle and valve assembly which uses two flat sealing surfaces, in lieu of a conical valve seat. A hand-actuated valve pin is forced against a cylindrical valve poppet, referred to as a valve seat, which has a flat sealing surface in contact with a flat sealing surface of a fixed valve seat. The valve pin has a conical sealing face which is positioned against a conical sealing face of the valve poppet. Such arrangements are prone to leakage. A hand-operated lever must provide all of the force necessary to keep the valve pin tightly positioned against the valve poppet. Such arrangement is nearly impossible to achieve in practical applications. Even a slight fluid leakage around the valve pin will drastically increase the hand force necessary to maintain the valve pin seated against the valve poppet.

U.S. Pat. No. 4,009,860 discloses a shutoff valve for high-pressure spray guns. The shutoff valve uses fluid forces to operate two valve poppets, a main valve poppet and a smaller pilot valve poppet, referred to as a differential piston and control piston, and a hand-actuated valve pin. The main valve poppet is free to slide within a valve cavity. Such sliding movement determines whether a valve port is open or closed. Such sliding movement is accomplished by the pressure differential from the pressurized fluid within the valve, which is controlled by a position of the pilot poppet that opens or closes a bypass channel. A hand-actuated valve pin is used to push the pilot poppet forward to open the bypass channel and to equalize fluid forces across the main valve poppet and thus open the main valve port. The valve pin does not have to seal any port and can be constructed in a relatively small size. Thus, fluid forces exerted on the valve pin can be reduced to a manageable level if the fluid pressure is not exceedingly high. To illustrate such point, a valve pin having a diameter of 0.0931" has a cross-sectional area of 0.0068 square inches. At a fluid pressure of 36,000 psi, the valve pin is pushed out by the fluid at a force of 245 $lb_f$. To push the valve pin into the valve and thus move the pilot poppet, a force significantly greater than 245 $lb_f$ is necessary, which is not easily accomplished. Reducing the diameter of the valve pin to 0.0781" reduces the required force to about 172 $lb_f$, which is still very difficult to achieve with the human hand. Furthermore, a 0.0781" diameter pin is a relatively small pin and thus its reliability becomes a negative factor. The valve according to the '860 patent has fluid leakage around the control poppet and around the conical sealing surface of the main poppet, due to the absence of necessary seals. Another disadvantage is that the main valve poppet may not close decisively when the hand force is removed. A natural tendency of the pressurized fluid is to keep the valve in an open position and some assistance, such as forces from a bias spring, must be provided to initiate the valve closure.

U.S. Pat. No. 4,349,154 teaches a hand-operated, high-pressure dump valve in which fluid-induced forces help reduce forces necessary through an operator's human hand. A hand-actuated valve pin which is significantly reduced in diameter is used to open and close a small pilot port which routes the pressurized fluid in a chamber to act on a larger valve poppet, referred to as a piston. The valve pin has one end exposed to the pressurized fluid while the opposite end is exposed to atmosphere. Thus, hand forces must overcome the fluid-induced force acting on the valve pin, thus limiting the pressure capability of such valve. Although an externally actuated control valve can be used to actuate the valve pin, such arrangement complicates field applications of such dump valves.

U.S. Pat. No. 4,406,383 teaches a sliding, fluid-actuated valve poppet, referred to as a H-shaped piston, which is used to open and close a valve port. Such sliding motion of a valve poppet is accomplished with the pressurized fluid through a hand-operated spool valve and a bypass channel. A pressure balanced spool valve is used to route the pressurized fluid to desired ports. The hand force necessary to push and pull the valve spool is reduced to a manageable level. However, the pressure capability suffers due to fluid leakage at the pilot port and around the spool. Because of inadequate sealing means, the pressurized fluid leaks through the pilot port when the valve is in a closed position. Leakage of the pressurized fluid through the pilot port causes the valve to open inadvertently, which creates a hazardous condition.

U.S. Pat. No. 4,665,944 teaches an on-off dump valve. Pressurized fluid is routed through a sliding hollow spool that is also used as a rotating spindle in a high-pressure swivel joint. By opening or closing a relatively small dump port bored within the hollow spindle, the pressurized fluid is dumped to relieve the pressure. Thus, the valve does not act as a shutoff valve. Furthermore, the reliability of such valve is poor since the dump ports slide across a seal each time the valve is actuated, without means to avoid erosion problems. At relatively high fluid pressures, the seal of such valve can be quickly damaged by fluid forces and actions. Once leakage occurs, the bearings of the swivel are useless.

U.S. Pat. No. 5,103,866 teaches a complex poppet valve which is designed to replace a conventional direct spool valve which is known to generate hydraulic shocks. A sliding spool valve is used to route the pressurized fluid to desired parts for opening and closing multiple valve poppets and to route the pressurized fluid to a desired outlet. Such valve is applied in conventional hydraulic systems operating at pressures below 5,000 psi. Such valve is not at all suitable for pressures above 10,000 psi, due to fluid sealing problems and due to extraordinary wear of valve parts.

In view of the known technology with respect to instant on-off valves, it is apparent that there is a need for a reliable instant on-off or shutoff valve which is suitable for hand operation at relatively high fluid pressures. As discussed with respect to the known technology, it is apparent that with conventional valves, the minimum force required to open and close valve ports is too high to be supplied by the human hand, particularly over extended periods of time. Thus, a significant reduction of the valve-actuating force is necessary to reduce operator fatigue. In view of conventional technology, the number of valve components, particularly the number of moving valve components, must be reduced to improve reliability of the valve while keeping in mind that failure of any valve component cannot result in inadvertent opening of the outlet port of the valve, for obvious safety reasons. In view of conventional technology, the reliability of the outlet port is inadequate due to severe erosion problems and thus the metal-to-metal sealing used in conventional valves, which is prone to leakage and erosion, must be improved. While enhancing conventional valves, the outlet port of the valve must be maintained at a suitable size in order to minimize the pressure drop across the outlet port.

SUMMARY OF THE INVENTION

It is one object of this invention to provide an on-off valve that is relatively simple in construction, having few parts and particularly few moving parts, which is capable of handling various fluids at relatively high pressures.

It is another object of this invention to provide an on-off valve which can be actuated instantly with a relatively moderate force, such as that conveniently obtained through the human hand, even over extended periods of time and even at relatively high operating pressures of the working fluid.

It is another object of this invention to provide an instant on-off valve that can be used alone or as a pilot valve in a compound valve system.

It is still another object of this invention to provide an instant on-off valve that can be easily modified to serve functions other than simple on-off operations, such as pressure regulation in a fluid system.

It is yet another object of this invention to provide an instant on-off valve which is capable of handling fluids that contain particulates, even at relatively high pressures, such as in water-jetting operations in which the water is unclean or contaminated with solids.

On-off valves are the type of fluid flow control valves that either allow full fluid flow or completely shut off the fluid flow. A wide range of conventional on-off valves have various designs, sizes, pressure capabilities, and modes of operation. Such conventional valves are often identified by the configuration of the main valve components, such as the part which opens and closes the fluid passage. Such conventional valves are commonly referred to as gate valves, butterfly valves, cock valves, globe valves, ball valves, poppet valves, needle valves and stem valves. As the working fluid pressure increases, the selection of suitable on-off valves decreases due to the difficulties in achieving fluid sealing and in operating the moving valve parts. As the fluid pressure increases to pressures above 10,000 psi, the selection of on-off valves is even further reduced, since conventional gate valves, butterfly valves, cock valves and globe valves are not suitable because of sealing difficulties, relatively high stresses on valve parts, and relatively high force levels required to operate the valve parts. Only poppet valves, stem valves and needle valves are capable of handling such relatively high fluid pressures. With such conventional valves, a hardened valve stem, valve needle or valve poppet, usually of circular cross section, is raised or lowered against a circular fluid passage commonly positioned at the center of a replaceable valve seat constructed of hardened metals. Conventional high-pressure on-off valves require a rotating motion, either manually or automatically, for raising or lowering a valve stem or valve needle. In many applications, such rotary motion is too slow and does not provide the required instant on-off action. In such case, the valve stem or valve needle must slide within the valve cavity to open or close the valve port.

Conventional stem valves and needle valves are available for handling instant on-off operations at fluid pressures above 60,000 psi. Such stem valves and needle valves have a valve stem constructed of a hardened metal which is positioned within a high-pressure valve cavity at one end and which is exposed to the atmosphere at the opposite end. The end exposed to the high-pressure fluid may contact the valve seat directly to open and close the fluid passage, or may contact a separate valve poppet, which controls the fluid passage. The end of the valve stem which is exposed to the atmosphere is in contact with a source of force that imparts the sliding movement to the valve stem. Such force can be supplied by a human hand or by automatic or powered devices, such as with compressed air, pressurized hydraulic fluid, electricity or the like. Conventional solenoids, pneumatic or hydraulic actuators are used to supply the required linear force to move the valve stem.

Fluid systems operating at pressures above 10,000 psi were relatively rare, particularly those that required instant on-off valves. Due to advances in waterjet technology in recent years, fluid systems operating at pressures above 30,000 psi are now relatively common. Thus, there is a need for reliable instant on-off valves for such fluid systems that operate at relatively high pressures, such as above 30,000 psi. Although available, conventional instant on-off valves have well-known shortcomings. The force required to operate the valve stems of conventional valves is inconveniently great. The reliability of valve parts is poor because of the extreme stresses encountered within the valve cavity.

For example, with a valve stem having a diameter of 0.251", which is exposed to pressurized fluid at 60,000 psi, the force exerted on the valve stem has a magnitude equal to the product of the cross-sectional area of the valve stem and the fluid pressure, or 2,940 lb$_f$. Such force tends to push the valve stem out of the valve cavity. Thus in order to close the valve, a force greater than 2,940 lb$_f$ must be applied at the opposite end of the valve stem, for example the end which is exposed to atmosphere. At 60,000 psi, the fluid would also exert a compression force of a relatively high magnitude to the valve stem seal, which in turn exerts a relatively high gripping or frictional force on the surface of the valve stem. As a result, a force of about 3,000 lb$_f$ is necessary to push the valve stem into a closed position of the valve. If a pneumatic actuator operating at 70 psi air pressure is used to operate the valve stem, the actuator must have an air piston of approximately 7.51" in diameter. Pneumatic actuators of such size are available but because of their size and weight are awkward to handle. If the pneumatic actuators are replaced with hydraulic actuators, the size of the power piston can be significantly reduced, but such systems operate with the inconveniences of hydraulic fluids. Thus, it is apparent that there is a need for an instant on-off valve having a valve stem of relatively small diameter, so that smaller actuators can be used to effectively move the valve stem. However, smaller valve stems usually result in smaller fluid passages and relatively fragile valve parts that are not acceptable in many applications. It is apparent that there is a need for an instant on-off valve which has adequate fluid passages and which has reliable valve components.

In some fluid systems, waterjetting operations in particular, an instant on-off valve must be operated by a human hand or foot. Such requirement presents a difficult task to valve designers due to the very limited force that the human hand or foot can provide, particularly over an extended period. As a result, various attempts to miniaturize valve parts and use fluid pressure to assist the operation of the valve have been attempted. The result of such efforts is the poppet valve in which a human hand or foot directly or indirectly moves a valve poppet to close or open a relatively large fluid passage. Some conventional poppet valves include a manually-operated, relatively small valve stem, which is used to engage with a relatively large valve poppet that opens or closes a valve port. In other conventional poppet valves, there is a manually-operated relatively small valve stem that opens or closes a fluid circuit which supplies or dumps pressurized fluid to a valve poppet. By virtue of using the available pressurized fluid to operate the valve parts, the force supplied by the human hand or foot is significantly reduced. Unfortunately, such pilot-operated valves for extreme fluid pressures are complex, expensive to construct, and unreliable.

The valve of this particular invention provides an instant on-off type of valve that is relatively simple in construction, easy to use, capable of handling fluid at extremely high pressures and reliable in operation. The valve according to this invention can stand alone or can be used as a pilot valve in a compound valving system.

BRIEF DESCRIPTION OF DRAWINGS

The above-mentioned and other features and objects of this invention will be better understood from the following detailed description taken in conjunction with the drawings wherein.

DESCRIPTION OF PREFERRED EMBODIMENTS

Figure 1:
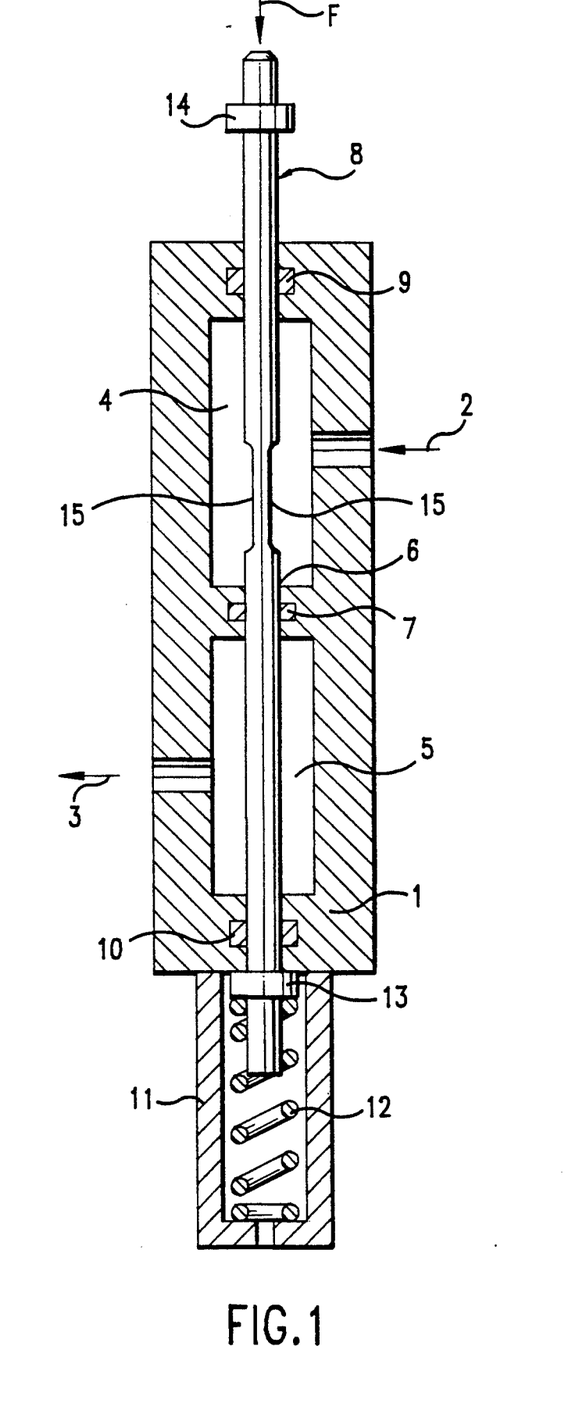
FIG. 1 is a simplified cross-sectional side view taken along a longitudinal axis of an instant on-off valve, according to one preferred embodiment of this invention, showing primary components with the valve in a closed position.

FIG. 1 shows a simplified cross-sectional side view, taken along a longitudinal axis, of an instant on-off valve in a closed position, according to one preferred embodiment of this invention. The remainder of this paragraph discusses primary components of such preferred embodiments. Valve body 1 is preferably cylindrical, square, rectangular or otherwise suitably shaped, and has fluid inlet 2 and fluid outlet 3, preferably but not necessarily at opposite sides of valve body 1. Valve body 1 also forms centrally bored upstream chamber 4, which is in communication with fluid inlet 2, and forms centrally bored downstream chamber 5, which is in communication with fluid outlet 3. Upstream chamber 4 and downstream chamber 5 are separated by valve port 6 which has seal assembly 7. Elongated, round valve stem 8 extends through valve body 1 and is centrally located within upstream chamber 4, downstream chamber 5, valve port 6, and seal assembly 7. Retainer means, such as a plug or another suitable retaining component, are used to retain each stem seal and each support ring within the corresponding seal cage and to retain each seal cage within valve body 1. Upstream stem seal 9 maintains operating fluid within upstream chamber 4 and downstream stem seal 10 maintains the operating fluid within downstream chamber 5. Positioning means are used to urge valve stem 8 into either a normally-open position or a normally-closed position. In one preferred embodiment of this invention, such positioning means comprise downstream plug 11 which houses stem spring 12 which contacts one exposed end of valve stem 8 at an integral or attached stop 13. Attached stop 14, which is positioned at the opposite exposed end of valve stem 8, provides means for applying an external pushing force upon valve stem 8 and also provides stop means for limiting axial movement of valve stem 8 between the open and the closed position of the valve. Valve stem 8 has fluid passages 15, which are preferably machined out of a mid-portion of valve stem 8, located at a section that is situated within upstream chamber 4 when the valve is in a closed position. Valve stem 8 is free to slide within valve body 1, within a specified distance which is defined by stops 13 and 14. Displacement means, such as a valve actuator, a hand lever or the like, are used to move valve stem 108 between the open position and the closed position of the valve.

When an external force F is applied to an exposed end of valve stem 8, as shown in FIG. 1, stop 13 acts to compress stem spring 12 and as valve stem 8 moves downward fluid passages 15 straddle valve port 6 thereby allowing fluid to flow from upstream chamber 4 to downstream chamber 5. When external force F is removed, stem spring 12 pushes valve stem 8 in an upward or upstream direction and valve stem 8 again plugs valve port 6. Such preferred type of valve is typically referred to as a "normally-closed" valve since valve port 6 is in a closed position when there is no external force applied to valve stem 8.

Valve stem 8 preferably has a relatively smooth surface to facilitate its sliding motion and fluidic sealing. Upstream stem seal 9, downstream stem seal 10 and seal assembly 7 are very important components for proper functioning of the valve according to this invention. The bias force of stem spring 12 can be assisted by fluid-induced forces within the valve or the bias force can be eliminated by an external push-pull force, which requires a magnitude greater than seal gripping or frictional forces acting on valve stem 8, which are induced by fluid within the valve. An external force is typically of relatively moderate magnitude since both ends of valve stem 8 are not exposed to the operating fluid. In most conventional valves, the ends of a similar valve stem are exposed to the operating fluid. If valve stem 8 is of uniform diameter, the fluid-induced force within the valve which is exerted on valve stem 8 is well-balanced and there is no net axial force along valve stem 8, in either the open or closed position of the valve.

Figure 2:
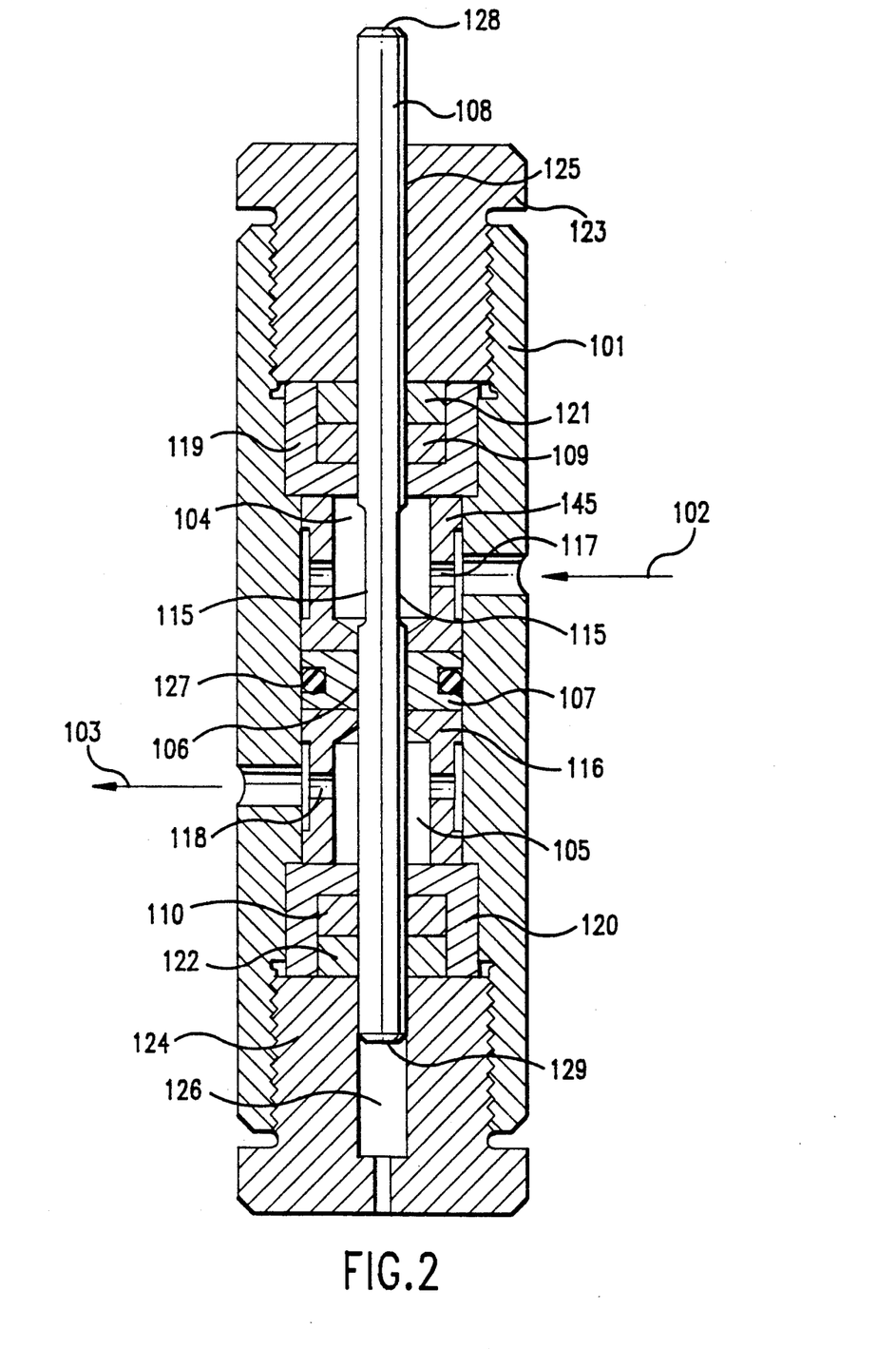
FIG. 2 is a partial cross-sectional side view taken along a longitudinal axis of an instant on-off valve, according to another preferred embodiment of this invention, with a valve port in a closed position.

FIG. 2 shows another preferred embodiment of this invention in which valve body 101 is preferably cylindrical and has fluid inlet 102 and fluid outlet 103 which are respectively in communication with upstream chamber 104 and downstream chamber 105. A central bore within valve body 101 preferably forms upstream chamber 104 and downstream chamber 105, which are separated by central seal means, such as valve port seal assembly 107, for preventing communication between upstream chamber 104 and downstream chamber 105 about valve stem 108 in the closed position of the valve. Valve port 106 is centrally positioned within a through hole of seal assembly 107. Seal assembly 107 is supported by upstream bushing 145 which has fluid passage 117 that is in communication with fluid inlet 102. Downstream bushing 116 has fluid passage 118 which is in communication with fluid outlet 103.

End seal means are used to seal upstream chamber 104 and downstream chamber 105, each about a corresponding portion of valve stem 108. Upstream chamber 104 is sealed by upstream seal cage 119 and downstream chamber 105 is sealed by downstream seal cage 120. Upstream seal cage 119 houses an upstream stem seal assembly comprising upstream stem seal 109 and support ring 121. Likewise, downstream seal cage 120 houses a downstream stem seal assembly comprising downstream stem seal 110 and support ring 122. Upstream seal cage 119 and the upstream stem seal assembly are supported by upstream plug 123, which is preferably threaded within valve body 101. Downstream seal cage 120 and the downstream stem seal assembly are supported by downstream plug 124, which is preferably threaded within valve body 101.

Upstream plug 123 and downstream plug 124 have through hole 125 and through hole 126, respectively, which are preferably centrally located, for accommodating valve stem 108. Valve stem 108 is centrally located within valve body 101 and extends beyond the upstream stem seal assembly and the downstream stem seal assembly. Valve stem 108 has fluid passages 115, which are preferably machined from the valve stem stock, that are fully positioned within upstream chamber 104 when the valve is at rest and valve port 106 is plugged by valve stem 108. With valve stem 108 closing valve port 106, pressurized fluid is contained within upstream chamber 104 and is prevented from flowing into downstream chamber 105, due to the presence of seal assembly 107, which may contain an O-ring seal 127 for additional sealing between seal assembly 107 and valve body 101.

Figure 3:
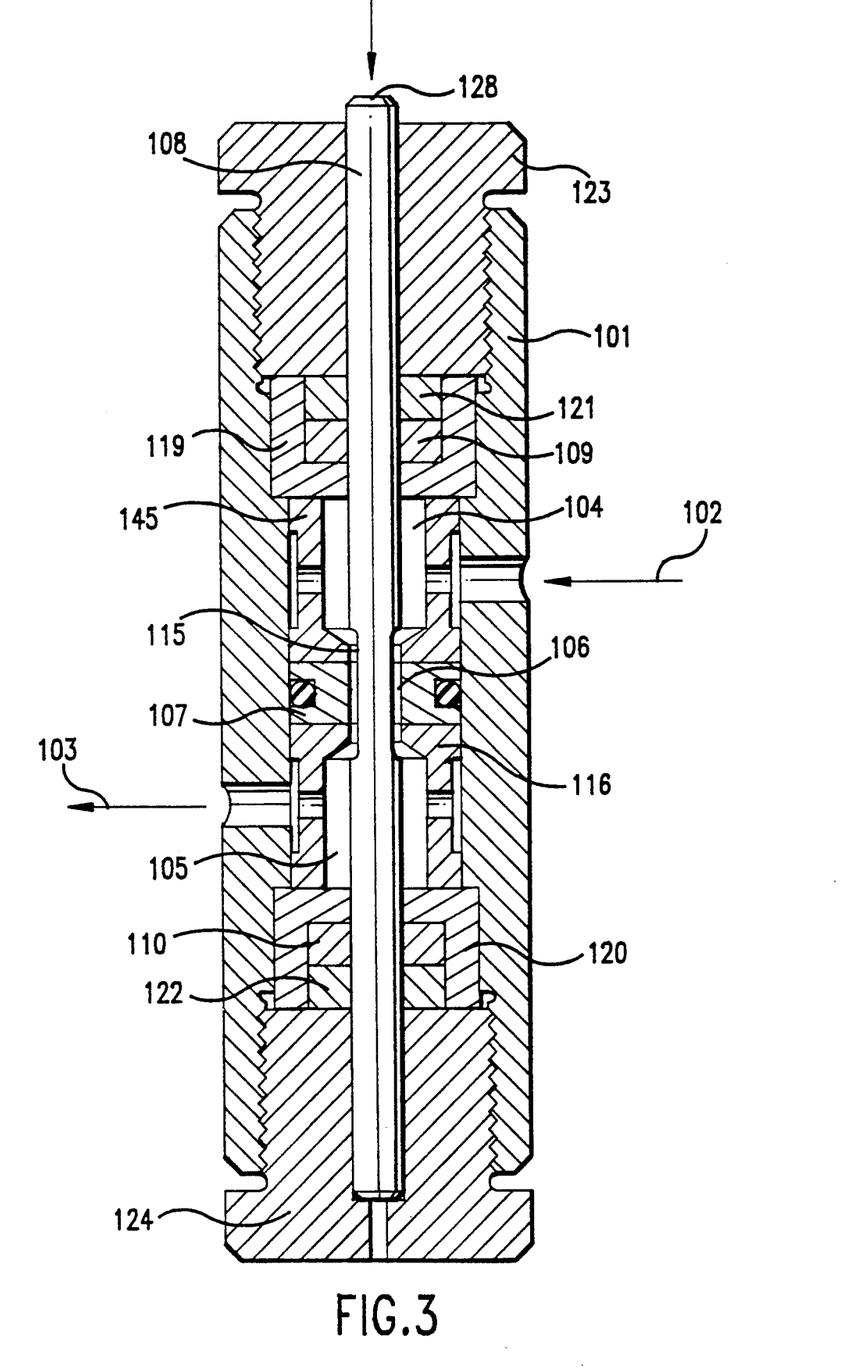
FIG. 3 is a partial cross-sectional side view taken along a longitudinal axis of an instant on-off valve, according to another preferred embodiment of this invention, with a valve port in an open position.

When a force is applied to push down on an upstream exposed end of valve stem 108, valve stem 108 slides downward until downstream end 129 of valve stem 108 bottoms out against downstream plug 124, as shown in FIG. 3. At such bottom out point, fluid passages 115 of valve stem 108 straddle across valve port 106 of seal assembly 107, thus allowing fluid to flow from upstream chamber 104, through fluid passages 115, to downstream chamber 105, and then out through fluid outlet 103. At such point, fluid pressure within upstream chamber 104 and downstream chamber 105 is equalized and the operating fluid is sealed or contained by upstream seal cage 119, downstream seal cage 120, and the associated stem seal assemblies. A push-pull force applied at valve stem end 128 opens and closes valve port 106. A pushing force opens valve port 106 and a pulling force closes valve port 106. The distance that valve stem 108 travels is precisely controlled by means for accurately positioning fluid passage 115 with respect to valve port 106.

Referring to FIGS. 2 and 3, valve body 101 is preferably constructed of steel suitable for the particular working fluid and fluid pressures involved with the application. The central bore within valve body 101 is preferably sized according to the operating fluid pressure and the type of fluid flow involved with the application. Upstream bushing 145 and downstream bushing 116 precisely fit within the central bore and are preferably constructed of steel capable of supporting seal assembly 107, which is preferably constructed of polymeric or other suitable plastic materials.

Valve stem 108 is preferably constructed of hardened steel, ceramic material, or other suitable relatively hard materials which provide a smooth surface for sealably engaging with the seal assemblies. Both upstream stem seal 109 and downstream stem seal 110 are preferably constructed of suitable polymers or plastics. Support rings 121, 122 are preferably constructed of materials that are relatively harder than the materials of upstream stem seal 109 and downstream stem seal 110. Upstream seal cage 119 and downstream seal cage 120 are preferably constructed of steel and have relatively smooth face surfaces capable of sealing the respective valve cavity. Upstream plug 123 and downstream plug 124 are preferably constructed of steel and have sufficient threads to support upstream seal cage 119 and downstream seal cage 120, particularly at the specified operating fluid pressures. To facilitate relative sliding motion, valve stem 108 should be precisely centered with respect to many of the valve components. Thus, the various valve components which accommodate valve stem 108 must have relatively high concentricity.

Figure 4A:
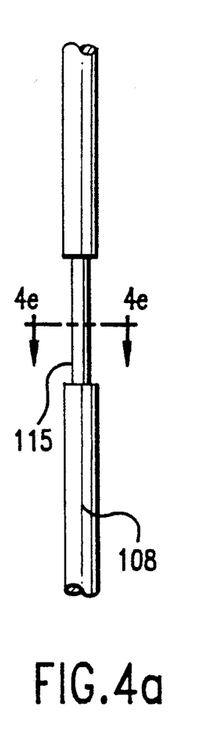
FIGS. 4a–4d each show a side view of a different embodiment of a valve stem, according to this invention.
Figure 4B:
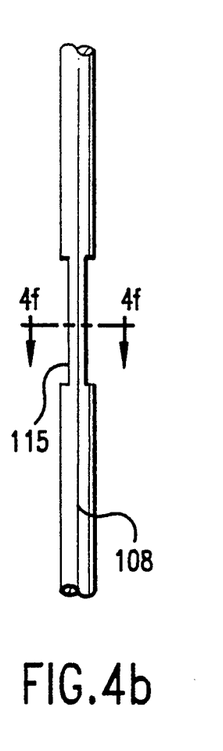
Figure 4C:
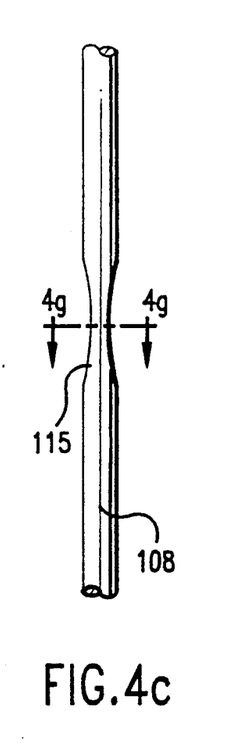
Figure 4D:
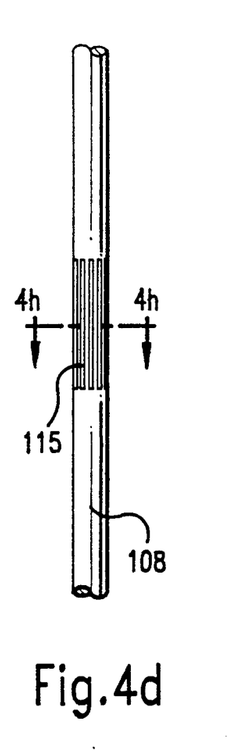
Figure 4E:
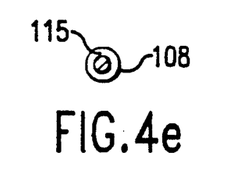
FIGS. 4e–4h show views taken along lines 4e—4e through 4h—4h, respectively, as shown in FIGS. 4a–4d.
Figure 4F:
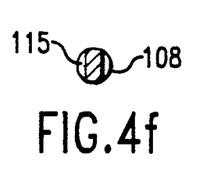
Figure 4G:
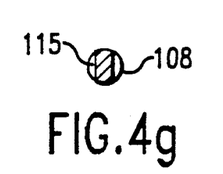
Figure 4H:
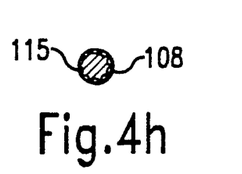

Various embodiments of valve stem 108 are shown in FIGS. 4a-4h. Fluid passages 115 are preferably formed by machining out or off a portion of valve stem 108 to form a reduced cross-sectional area portion of valve stem 108. Fluid passage 115 can be constructed in many various shapes, each of which may affect flow capacities and other operating conditions of the valve. Valve stem 108 preferably forms a plurality of passages 115 which are equally positioned about the circumference of valve stem 108. FIGS. 4a-4d show side views of valve stem 108, while FIGS. 4e-4h show respective top views of valve stems 108 as shown in FIGS. 4a-4d. FIGS. 4a and 4e show valve stem 108 forming fluid passage 115 by turning a neck portion around valve stem 108. FIGS. 4b and 4f show valve stem 108 having two parallel flats. FIGS. 4c and 4g show valve stem 108 having two curved cuts. FIGS. 4d and 4h show valve stem 108 having multiple and parallel longitudinal grooves cut about the circumference of valve stem 108. It is apparent that other shapes and combinations of fluid passages 115 can be used to accomplish the same result of allowing fluid to pass along a longitudinal axis of valve stem 108. Of the preferred embodiments shown in FIGS. 4a-4d, valve stem 108 according to FIG. 4a has the largest flow capacity but may create hydraulic shock, valve stem 108 according to FIG. 4b provides relatively good seal alignment and relatively good flow capacity, valve stem 108 according to FIG. 4c absorbs or cushions hydraulic shock during valve actuation, and valve stem 108 according to FIG. 4d produces relatively minimal hydraulic shock but also accommodates relatively minimal flow capacity.

Figure 5:
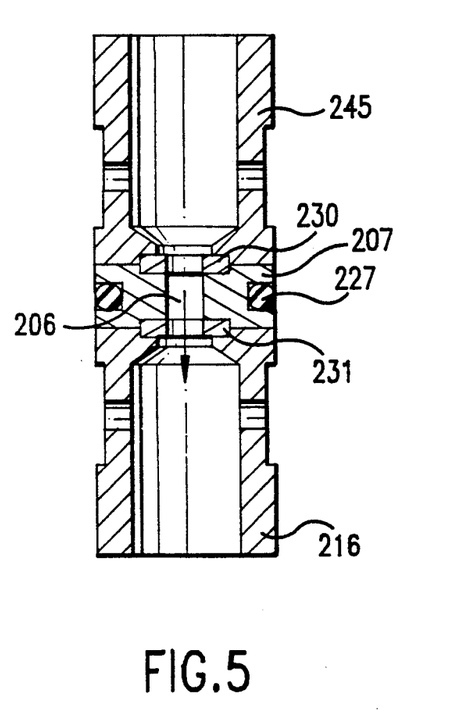
FIG. 5 is a cross-sectional side view taken along a longitudinal axis of a valve port seal assembly and support bushings, having two hard seal bushings for protecting the valve-port seal, according to another preferred embodiment of this invention.

FIG. 5 shows a cross-sectional side view of one preferred valve port seal assembly, according to this invention. Such seal assembly, which is sandwiched between supporting upstream bushing 245 and supporting downstream bushing 216, comprises entry ring 230, valve port seal 207, O-ring seal 227 and exit ring 231. Entry ring 230 and exit ring 231 are preferably constructed of relatively hard materials, such as hardened steel, synthetic gem stones, ceramics, and the like. Entry ring 230 and exit ring 231 have precisely centered through holes to accommodate the valve stem. Entry ring 230 and exit ring 231 are sandwiched between valve port seal 207 and upstream bushing 245 and downstream bushing 216, respectively, preferably with relatively accurate concentricity. Entry ring 230 and exit ring 231 are used to protect valve port seal 207, since the operating fluid can be extremely destructive at the moment the valve opens, and can be used to serve as guides facilitating the sliding motion of the valve stem. This particular multiple-element valve port seal arrangement can be installed within valve cavities that may have only upstream bushing, 245 and not downstream bushing 216, which can be omitted by having a separate valve cavity, as shown in FIG. 6.

Figure 6:
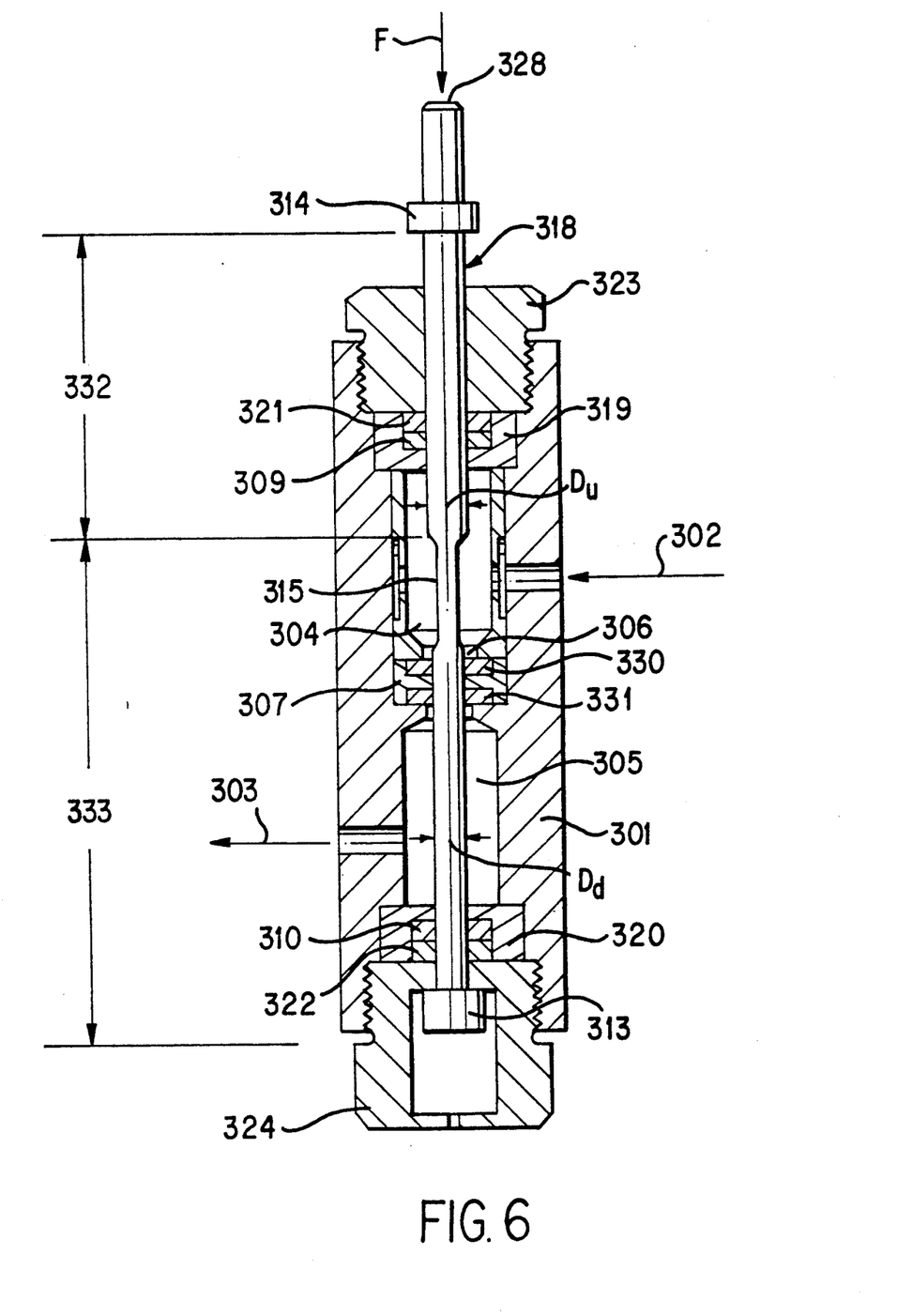
FIG. 6 is a simplified cross-sectional side view of an instant on-off valve, according to yet another preferred embodiment of this invention, showing a valve stem having an upstream diameter greater than a downstream diameter for accommodating normally-closed operation of the valve.

Referring to the preferred embodiment of this invention shown in FIG. 6, valve stem 308 does not have uniform diameter along its length. Upstream portion 332 of valve stem 308, which is positioned above fluid passage 315, has a diameter $D_u$ which is slightly larger than a diameter $D_d$ of downstream portion 333 of valve stem 308, which is positioned below fluid passage 315, as shown in FIG. 6. Upstream portion 332 of valve stem 308 is associated with upstream chamber 304 and fluid inlet 302. As shown in FIG. 6, downstream portion 333 of valve stem 308 is associated with downstream chamber 305 and fluid outlet 303. Valve port 306 is of a size sufficient to accommodate diameter $D_d$ of downstream portion 333. With such dimensions and component arrangements, fluid-induced forces are created in a controlled fashion so that the desired magnitude and direction of the forces within the valve cavity assist valve actuation. By having diameter $D_u$ greater than diameter $D_d$, as shown in FIG. 6, a net force is generated by pressurized fluid within the valve cavity to urge valve stem 308 upward at all times. When the valve is undisturbed, valve stem 308 is at its uppermost position, which is defined by downstream stop 313, by virtue of the fluid-induced lifting force. The magnitude of such force can be estimated by a difference in cross-sectional area between upstream portion 332 and downstream portion 333, and the fluid pressure. As the fluid pressure and the differential area increase, the lifting port valve closure force also increases.

To open a valve according to this invention, a push down force F greater than the valve closure force must be applied to upstream valve stem end 328 of valve stem 308, until the movement of valve stem 308 is stopped by upstream stop 314, which signals that fluid passage 315 is in a position that straddles valve port 306, thereby allowing fluid to flow through fluid passage 315. Such external push down force F must be maintained in order to keep the valve in an open position. To close the valve, such external force F must either be overcome or removed and the pressurized fluid within the valve should then automatically move valve stem 308 and close valve port 306.

The automatic valve-closure feature according to this invention is achieved without the use of springs. However, a suitable bias spring positioned at the downstream end of valve stem 308 can aid the closing action of the valve when there is no pressure within the valve cavity. Such particular aspect of this invention enables the on-off valve according to this invention to be referred to as a "normally-closed" or "power-to-open" type valve. Such feature is particularly important when dealing with instant on-off valves operated by forces generated from human hands. Without such fluid-induced force, the return of the valve stem to close the valve port must be accomplished with a compression spring, which is very difficult for a human to continuously operate, particularly over an extended time period and when the operating fluid pressures are relatively high. Most ordinary springs do not provide sufficient force for such application.

Figure 7:
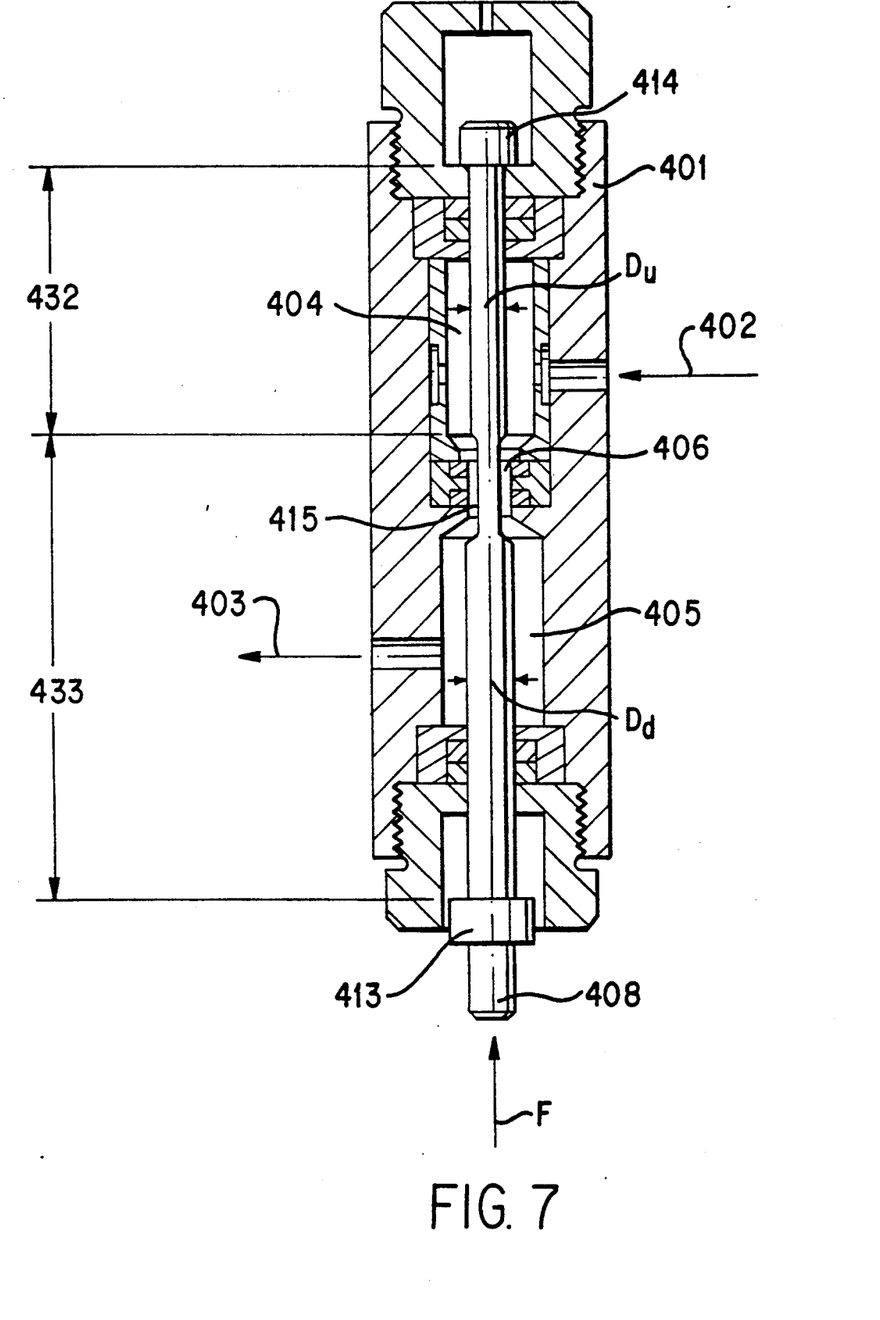
FIG. 7 is a simplified cross-sectional side view of an instant on-off valve, according to still another preferred embodiment of this invention, with a valve stem having an upstream diameter less than a downstream diameter for normally-open operation of the valve.

FIG. 7 shows another preferred embodiment according to this invention, in which valve body 401 contains valve stem 418 having two dissimilar diameters just the opposite from that shown in FIG. 6. As shown in FIG. 7, diameter $D_u$ of upstream portion 432 is less than diameter $D_d$ of downstream portion 433. Valve port 406 is preferably sized to accommodate downstream portion 433 of valve stem 408.

With the presence of pressurized fluid within the valve, a constant fluid-induced force pushes valve stem 408 downward, against external force F as shown in FIG. 7, until it is stopped by upstream stop 414. In such position, fluid passage 415 straddles valve port 406 and thus allows fluid to flow through the valve in a downstream direction from fluid inlet 402 to fluid outlet 403. Such valve-opening force can be precisely controlled as a function of diameters $D_u$ and $D_d$.

In order to close the valve, pushing force F is applied at a downstream exposed end of valve stem 408, as shown in FIG. 7, to overcome the fluid-induced force until valve stem 408 stops at downstream stop 413 and valve port 406 is closed by valve stem 408. To reopen the valve, the external force F is simply removed and fluid within the valve automatically acts to reopen valve port 406. Such feature provides a "normally-open" or "power-to-close" type of valve according to this invention, which is equally useful in many industrial applications as the "normally-closed" type of valve previously discussed. Such particular feature of this invention allows the on-off valve to be used as a fluid pressure regulator if an adjustable compression spring is positioned against the downstream end of the valve stem to supply an uplifting force. With a proper spring force with respect to the fluid-induced force on the valve stem, the valve can be set to open when the fluid pressure within the valve exceeds a set value, thus allowing the fluid to escape and thereby reducing the fluid pressure. The valve stem is then pushed upward by the spring and again closes the valve port. The automatic sliding motion of the valve stem keeps the fluid pressure within the valve at a constant level. Such constant level can be increased or decreased by adjusting the spring force. Such spring force can also be replaced with an air-operated actuator or a similar and suitable actuator, for greater sensitivity. Any such pressure regulator can function with relatively high pressure sensitivity by incorporating special fluid passages on the valve stem so as to vary the size of the fluid passage with the movement of the valve stem.

Figure 8:
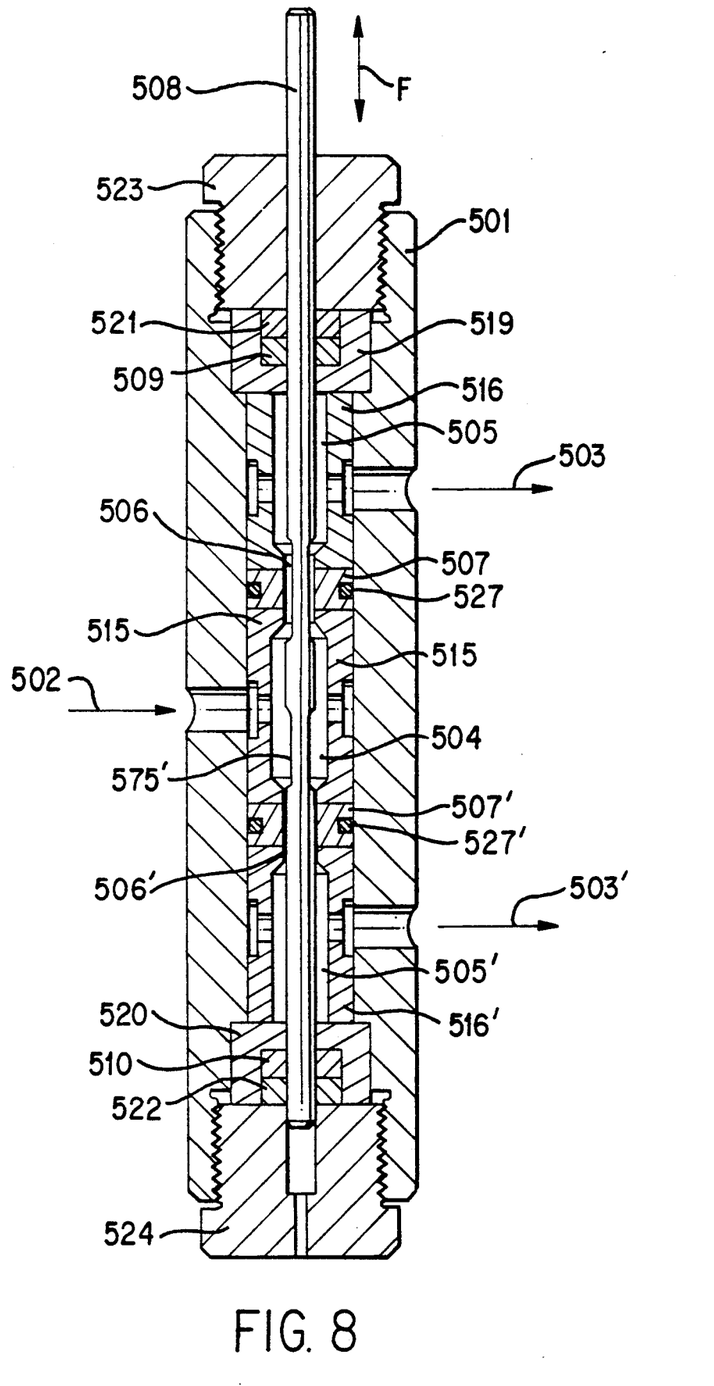
FIG. 8 is a partial cross-sectional side view of an instant on-off valve, according to still another preferred embodiment of this invention, with the valve having one inlet and two separate outlets which are operated alternately.

FIG. 8 shows another preferred embodiment, according to this invention, of an instant on-off valve having one fluid inlet and two fluid outlets that alternately open and close. As shown in FIG. 8, valve body 501 has fluid has fluid inlet 502 and fluid outlets 503, 503' which are in communication with an elongated central bore that is divided into three chambers by valve port seals 527, 527' which are sandwiched between support bushings 515, 515', 516, 516' to form upstream chamber 504 and two downstream chambers 505, 505'. An end of downstream chamber 505 is plugged by seal cage 519 while an end of downstream chamber 505' is plugged by seal cage 520. Seal cage 519 comprises stem seal 509 and support ring 521 while seal cage 520 comprises stem seal 510 and support ring 522. End plugs 523, 524 are threaded and mated within valve body 501 to support seal cages 519, 520 and the corresponding stem seal assemblies.

End plugs 523, 524, seal cages 519, 520, stem seals 509, 510, support rings 521, 522, valve port seals 527, 527' and support bushings 515, 515', 516, 516' all have central through holes, preferably concentric, to accommodate valve stem 508. Valve stem 508 has two sets of fluid passages 515, 515' in proper spaced relationship between two valve ports 506, 506'. Each fluid passage 515 works in conjunction with valve port 506 while each fluid passage 515' works in conjunction with valve port 506'.

Valve stem 508 has two operating positions defined by suitable stem stoppers or other external stop means. In one position, fluid passage 515 straddles valve port 506 while valve port 506' is plugged by valve stem 518. In the other position, fluid passage 515' straddles valve port 506' while valve port 506 is plugged by valve stem 518. When sliding valve stem 508 is moved between the two positions, fluid outlets 503, 503' are alternately opened and closed.

The dual-outlet valve discussed above can be constructed to have a preferred position by using a dual-diameter valve stem 508, similar to valve stems 308, 408 of FIGS. 6 and 7, respectively. Thus, the valve can be constructed to maintain fluid outlet 503 or 503' open when the valve is not energized with an external force F which is applied to valve stem 508. Such feature of this invention can be advantageous for a hand-operated dump valve that typically has one inlet and two outlets, where one outlet is a work outlet and the other outlet is a dump outlet, which must be closed by an operator when fluid pressure is required to pass through the work outlet.

One important aspect of this invention is the elongated sliding valve stem which either extends beyond the valve cavity or has two ends that are exposed to the working fluid at different pressures. The valve cavities are separated by suitable seals. Each valve port acts as a seal assembly for the valve stem. As discussed above, the fluid passages are preferably machined out of the valve stem. For relatively high pressure applications, the valve port seal assemblies should have relatively hard rings to protect the valve port seal. The sliding movement of the valve stem is accomplished with an external force but can also be aided by fluid-induced forces from within the valve cavity. The external force can be either a mechanical force, an electromechanical force, a hydraulic force or another suitable type of force.

Movement of the valve stem should be initiated in the same direction as the fluid flow when the valve is in a closed position in which the fluid passages are initially positioned within the high pressure chamber. By sliding the valve stem in a direction toward the low pressure chamber, the fluid passages of the valve stem move toward the valve port and eventually straddle the valve port. The valve stem cannot be moved from the low pressure end of the valve toward the high pressure end, due to fluid-induced forces acting on the valve port seal. Once the valve port is open and the fluid pressure within the upstream chamber and the downstream chamber is equalized, the valve stem is then free to move in the opposite direction to close the valve port.

Figures 9, 9A:
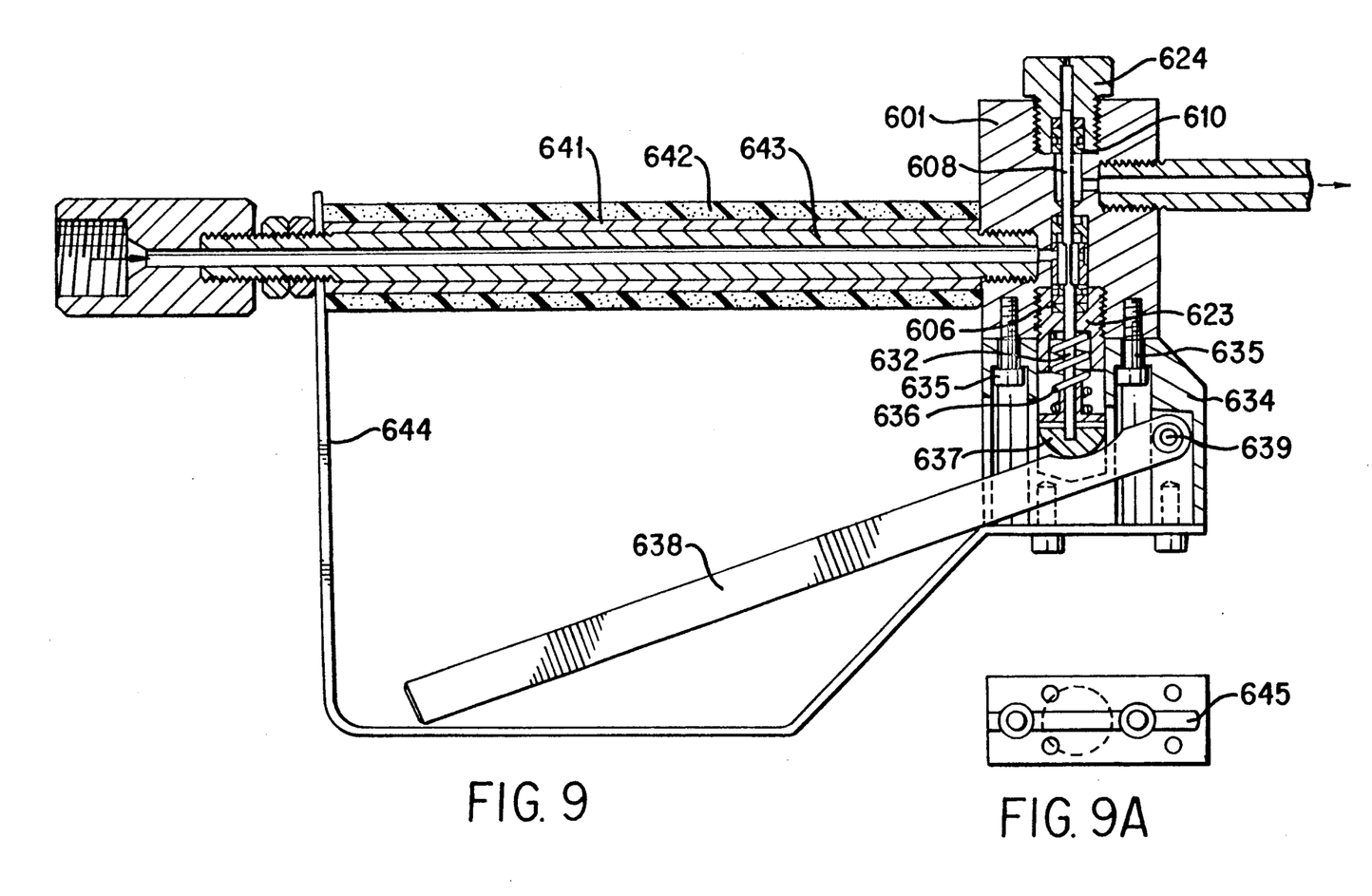
FIG. 9 is a partial cross-sectional view, taken along a longitudinal axis, of an instant on-off valve with an adapter and handle arrangement, according to one preferred embodiment of this invention.
FIG. 9A is a bottom view of a valve adapter of the instant on-off valve shown in FIG. 9.

It is apparent that the instant on-off valve according to this invention is extremely simple and has only one moving part, the valve stem. The valve according to this invention is very reliable, particularly if the valve stem and the seals are constructed with materials which are suitable for the particular fluid application, which would be apparent to a person skilled in the art. The valve according to this invention can operate both at relatively low fluid pressures and at relatively high fluid pressures. The valve according to this invention can be constructed to require various actuation forces ranging from relatively moderate for operation by a lever, as shown in FIG. 9, to relatively stiff forces which require automatic or powered actuators having a relatively small size and thus relatively small power requirement. By using a relatively hard valve stem and an elastic valve port seal, the on-off valve of this invention can function with fluids that contain particulates, which are known to cause problems with other conventional valves having metal-to-metal seals. Thus, the valve according to this invention can be used in waterjetting operations in which contaminated water requires no filtering to the level of micron particle sizes. Thus, the valve according to this invention can greatly reduce the costs associated with filtration.

EXAMPLE

An instant on-off valve, similar to the preferred embodiment of this invention as shown in FIG. 6, was tested. The valve body tested was rectangular in shape, having dimensions of 2"×3.4"×1". Upstream chamber 304 was 0.440" in diameter and downstream chamber 305 was 0.312" in diameter. Upstream chamber 304 was 0.850" deep and housed a three-element valve port seal assembly and an upstream bushing. Downstream chamber 305 was 0.650" deep and was void. Valve body 301 was constructed of stainless steel and had fluid inlet 302 at one side and fluid outlet 303 on an opposite side, similar to that as shown in FIG. 6. Valve stem 308 was constructed of hardened stainless steel, having a total length of 4.250", an upstream diameter $D_u$ of 0.136" and a downstream diameter $D_d$ of 0.125", corresponding to a cross-sectional area differential of 0.00204 square inches. The valve port seal assembly comprised entry ring 330, valve port seal assembly 307 and exit ring 331. Entry ring 330 and exit ring 331 were identical and were constructed of a relatively hard synthetic sapphire and each had a central through hole just slightly larger than 0.125", to allow valve stem 308 to freely slide. Valve port seal 307 was constructed of a suitable plastic and had a central through hole which was slightly greater than 0.125", also to allow valve stem 308 to freely slide.

Upstream seal cage 319 housed upstream stem seal 309 and support ring 321. Upstream seal cage 319 was preferably constructed of stainless steel and had a dimension of 0.680" in diameter, and 0.400" thick. Upstream stem seal 309 was preferably constructed of plastic and had a central through hole slightly larger than 0.135" in diameter, in order to snugly and sealingly accommodate valve stem 308. Support ring 321 was preferably constructed of a relatively harder plastic and also had a central through hole of slightly greater than 0.135" in diameter. Downstream seal cage 320, downstream stem seal 310 and downstream support ring 322 were identical to the corresponding upstream components just described, except that the central through hole was sized to accommodate the 0.125" in diameter $D_d$ of downstream portion 333 of valve stem 308.

As shown in FIG. 6, upstream plug 323 had only a central through hole to accommodate the upstream portion 332 of valve stem 308. Although not shown in FIG. 6, the valve tested had downstream plug 324 which housed a compression spring that contacted the downstream end of valve stem 308 to provide an uplifting force of moderate level which was estimated at approximately 2 $lb_f$, when compressed fully by valve stem 308. Upstream plug 323 and downstream plug 324 were threaded into valve body 301 and torqued tightly to force upstream seal cage 319 and downstream seal cage 320 tightly against valve body 301 to seal upstream chamber 304 and downstream chamber 305, respectively.

The valve that was tested according to this invention was connected at an inlet to a pump with a hose capable of handling water safely at 40,000 psi. An outlet of the pump was connected to a tube that led to a nozzle having an orifice of 0.015" in diameter. In such valve that was tested according to this invention, the upstream end of valve stem 308 engaged with a lever, approximately 8" long, through which hand force was easily applied, similar to the handle arrangement shown in FIG. 9. The pump was an intensifier type pump which was capable of pressurizing water up to 45,000 psi. At 0 psi, the on-off valve according to this invention required relatively little hand force to operate, since the hand force was acting only against a compression spring at the opposite end of valve stem 308. At 5,000 psi water pressure, the 8" hand lever was taut, since water induced a force working together with the spring to lift valve stem 308 against the lever. Still, relatively little force was required to move valve stem 308 downward to open the valve by pushing down on the lever. No hydraulic shock was experienced upon opening or closing the valve, indicating that fluid passages 315 allowed the fluid to flow smoothly through the valve. A valve stem as shown in FIG. 4c was used in the experiment. Valve stem 308 was returned to a closed position upon releasing the hand force on the lever. As the working fluid pressure was increased, the hand force required to open the valve was also increased. At 30,000 psi working fluid pressure, a hand force estimated at 10 $lb_f$ was required to lower the lever and thus to open the valve. Once the valve was open, a slightly lesser hand force was required to keep the valve open, since friction between the seal assembly and valve stem 308 assisted in holding valve stem 308 in a stationary position. When the force on the lever was released, the water-induced lifting force automatically returned valve stem 308 to a closed position. Such force was estimated at 60 $lb_f$, at a water pressure of 30,000 psi, and was significantly greater than the force due to friction between the seal assembly and valve stem 308. Even at 30,000 psi water pressure, the on-off valve according to this invention exhibited smooth on-off operations with relatively little hydraulic shock, or a "water hammer" effect commonly found with other conventional on-off valves. Repeated on-off operations with the valve according to this invention proved the reliability of the stem seal assemblies, since no seal wear was visibly apparent.

FIG. 9 shows a partial cross-sectional view of an instant on-off valve having a discharge tube, an inlet tube, an adapter, a handle and a trigger for supplying an external force to valve stem 608. Valve body 601 and its components are similar to other preferred embodiments of this invention as previously described, with a few exceptions. For example, the preferred embodiment shown in FIG. 9 does not have either an upstream seal cage or a downstream seal cage. Furthermore, upstream stem seal 609 and downstream stem seal 610 are positioned within upstream plug 623 and downstream plug 624, respectively.

Also as shown in FIG. 9, adapter 634 is secured with respect to valve body 601 with anchor bolts 635. It is apparent that adapter 634 can be secured with respect to valve body 601 in any other suitable manner. Stem spring 636 is shown as a coil spring which is positioned around upstream portion 632 of valve stem 608. One end of stem spring 636 abuts upstream plug 623 and the opposite end of stem spring 636 abuts valve stem anchor 637. Valve stem anchor 637 is secured with respect to valve stem 608. According to the preferred embodiment shown in FIG. 9, valve stem anchor 637 has a rounded head which fits within a correspondingly rounded cutout of trigger 638. Pivot pin 639 is used to pivotally mount trigger 638 with respect to adapter 634. Trigger 638 is positioned within slot 645 within adapter 634. Handle 641 and handle cover 642 are positioned around inlet tube 643. Trigger guard 644 is used to complete the handle arrangement of such preferred embodiment.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

I claim:

1. An on-off valve comprising:
   a valve body having a fluid inlet, an upstream chamber, a downstream chamber, and a fluid outlet, in an open position of the on-off valve said fluid inlet, said upstream chamber, said downstream chamber and said fluid outlet in communication with each other;
   a valve stem slidably mounted with respect to said valve body, said valve stem having an upstream portion and a downstream portion, said upstream portion having a reduced cross-sectional area portion forming at least one fluid passage in communication with said upstream chamber, in a closed position of the on-off valve communication being prevented between each said fluid passage and said downstream chamber;
   central seal means for preventing communication between said upstream chamber and said downstream chamber about said downstream portion of said valve stem in said closed position, said central seal means comprising a rigid seal assembly sealably mounted between said upstream chamber and said downstream chamber, said rigid seal assembly having a seal assembly through hole, and said valve stem sealably mounted within said seal assembly through hole, an upstream bushing positioned within said upstream chamber, said upstream bushing having an upstream bushing through hole and a downstream bushing face abutting an upstream seal face of said rigid seal assembly, said upstream portion of said valve stem positioned within said upstream bushing through hole, a rigid entry ring mounted between and contacting said rigid seal assembly and said upstream bushing, a downstream bushing positioned within said downstream chamber, said downstream bushing having a downstream bushing through hole and an upstream bushing face abutting a downstream seal face of said rigid seal assembly, said downstream portion of said valve stem positioned within said downstream bushing through hole, a rigid exit ring mounted between and contacting said rigid seal assembly and said downstream bushing;
   end seal means for sealing said upstream chamber about said upstream portion of said valve stem and for sealing said downstream chamber about said downstream portion of said valve stem;
   positioning means for urging said valve stem into one of a normally-open position and a normally-closed position; and
   displacement means for moving said valve stem between said closed position and said open position.

2. An on-off valve according to claim 1 wherein said upstream portion of said valve stem is partially positioned within said upstream chamber, said downstream portion of said valve stem is partially positioned within said downstream chamber, and opposite ends of said valve stem extend beyond said end seal means.

3. An on-off valve according to claim 1 wherein said upstream portion has a plurality of said fluid passages equally positioned about a circumference of said valve stem.

4. An on-off valve according to claim 1 wherein in said open position said at least one fluid passage is in communication between said upstream chamber and said downstream chamber.

5. An on-off valve according to claim 1 wherein each said fluid passage is a machined cutout section of said upstream portion of said valve stem.

6. An on-off valve according to claim 1 further comprising an O-ring, said seal assembly having a peripheral groove, and said O-ring mounted within said peripheral groove between said seal assembly and an inner chamber wall of said valve body.

7. An on-off valve according to claim 1 wherein said end seal means comprise an upstream seal cage mounted within said valve body, said upstream seal cage having a cage through hole, said upstream portion of said valve steam sealably mounted within said cage through hole, and said upstream seal cage abutting said upstream bushing.

8. An on-off valve according to claim 7 further comprising an upstream stem seal having a stem seal through hole, an upstream support ring having a ring through hole, said upstream stem seal and said upstream support ring housed within said upstream seal cage, said upstream stem seal abutting said upstream seal cage, said upstream support ring abutting said upstream seal cage, and said upstream portion of said valve stem sealably mounted within said stem seal through hole and said ring through hole.

9. An on-off valve according to claim 8 further comprising retainer means for retaining said upstream stem seal and said upstream support ring within said upstream seal cage and for retaining said upstream seal cage within said valve body.

10. An on-off valve according to claim 9 wherein said retainer means comprise an upstream plug having a plug through hole, said upstream portion of said valve stem mounted within said plug through hole, and said upstream plug abutting said upstream seal cage and said upstream support ring.

11. An on-off valve according to claim 1 wherein said end seal means comprise a downstream seal cage mounted within said valve body, said downstream seal cage having a cage through hole, said downstream portion of said valve stem sealably mounted within said cage through hole, and said downstream seal cage abutting said downstream bushing.

12. An on-off valve according to claim 11 further comprising a downstream stem seal having a stem seal through hole, a downstream support ring having a ring through hole, said downstream stem seal and said downstream support ring housed within said downstream seal cage, said downstream stem seal abutting said downstream seal cage, said downstream support ring abutting said downstream seal cage, and said downstream portion of said valve stem sealably mounted within said stem seal through hole and said ring through hole.

13. An on-off valve according to claim 12 further comprising retainer means for retaining said downstream stem seal and said downstream support ring within said downstream seal cage and for retaining said downstream seal cage within said valve body.

14. An on-off valve according to claim 13 wherein said retainer means comprise: a downstream plug having a plug through hole, said downstream portion of said valve stem mounted within said plug through hole, and said downstream plug abutting said downstream seal cage and said downstream support ring.

15. An on-off valve according to claim 1 wherein said positioning means comprise a spring mounted to transfer an axial force to said valve stem.

16. An on-off valve according to claim 1 wherein said displacement means comprise actuation means for applying an axial force to said valve stem.

17. An on-off valve according to claim 1 further comprising stop means for limiting axial movement of said valve stem between said open position and said closed position.

18. An on-off valve according to claim 17 wherein said stop means further comprise said valve stem having at least one shoulder abutting a surface fixed with respect to said valve body.

19. An on-off valve according to claim 1 wherein said end seal means comprise a stem seal mounted to said valve body, said stem seal having a stem seal through hole, and said valve stem sealably mounted within said stem seal through hole.

20. An on-off valve according to claim 1 wherein said upstream portion and said downstream portion of said valve stem have different outside diameters.

21. An on-off valve comprising:
a valve body having a fluid inlet, an upstream chamber, a downstream chamber, and a fluid outlet, in an open position of the on-off valve said fluid inlet, said upstream chamber, said downstream chamber and said fluid outlet in communication with each other;
a valve stem slidably mounted with respect to said valve body, said valve stem having an upstream portion and a downstream portion, said upstream portion having a reduced cross-sectional area portion forming at least one fluid passage in communication with said upstream chamber, in a closed position of the on-off valve communication being prevented between each said fluid passage and said downstream chamber;
central seal means for preventing communication between said upstream chamber and said downstream chamber about said downstream portion of said valve stem in said closed position, said central seal means comprising a rigid seal assembly sealably mounted between said upstream chamber and said downstream chamber, said rigid seal assembly having a seal assembly through hole, and said valve stem sealably mounted within said seal assembly through hole, an upstream bushing positioned within said upstream chamber, said upstream bushing having an upstream bushing through hole and a downstream bushing face abutting an upstream seal face of said rigid seal assembly, said upstream portion of said valve stem positioned within said upstream bushing through hole, a rigid entry ring mounted between and contacting said rigid seal assembly and said upstream bushing, a rigid exit ring mounted between and contacting said rigid seal assembly and an inner shoulder of said valve body;
end seal means for sealing said upstream chamber about said upstream portion of said valve stem and for sealing said downstream chamber about said downstream portion of said valve stem;
positioning means for urging said valve stem into one of a normally-open position and a normally-closed position; and
displacement means for moving said valve stem between said closed position and said open position.

* * * * *